United States Patent
Liao

(10) Patent No.: US 6,371,398 B1
(45) Date of Patent: Apr. 16, 2002

(54) POSITIONING DEVICE OF A WIRE GROOVE IN A WIRE WINDING BOX

(76) Inventor: Sheng-Hsin Liao, No. 10, Alley 38, Lane 229, San Chun St., Shu Lin, Taipei Hsien (TW)

( * ) Notice: Subject to any disclaimer, the term of this patent is extended or adjusted under 35 U.S.C. 154(b) by 49 days.

(21) Appl. No.: 09/631,772

(22) Filed: Aug. 3, 2000

(51) Int. Cl.$^7$ ................................................ B65H 75/48
(52) U.S. Cl. ............................... 242/378.1; 242/385.1; 191/12.4; 439/501
(58) Field of Search .............................. 242/378, 378.1, 242/378.4, 385.1; 191/12.4; 439/501

(56) References Cited

U.S. PATENT DOCUMENTS 6,254,025 B1 * 7/2001 Liao ........................ 242/378.1

* cited by examiner

Primary Examiner—John Q. Nguyen
(74) Attorney, Agent, or Firm—Rosenberg, Klein & Lee

(57) ABSTRACT

A positioning device of a wire groove in a wire winding box, and especially to a wire winding box for automatically winding a communication wire and receiving the communication wire therein is disclosed. The inner lateral surface of the wire groove of the box body has at least one positioning piece. When the communication wire is inserted from the groove hole of the shaft of the box body, it at first passes through a positioning groove between the positioning piece and the shaft so that the communication wire is clamped and positioned in the positioning groove not to be pulled. Therefore, when one end of the communication wire is pulled from the wire winding box, another end will not be affected. That is, another end will not reduce into the box body. Therefore, two ends of the communication wire may retain a predetermined length to expose out.

5 Claims, 8 Drawing Sheets

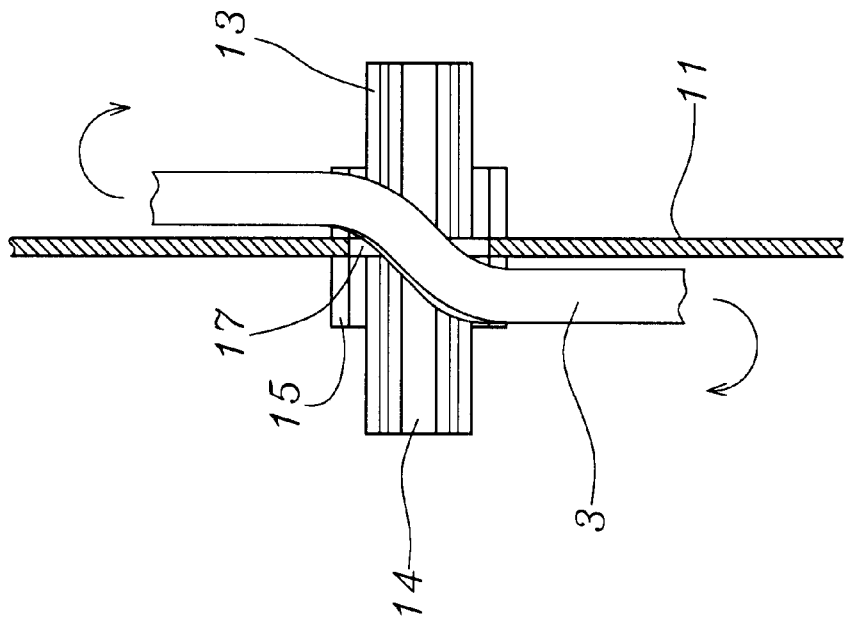
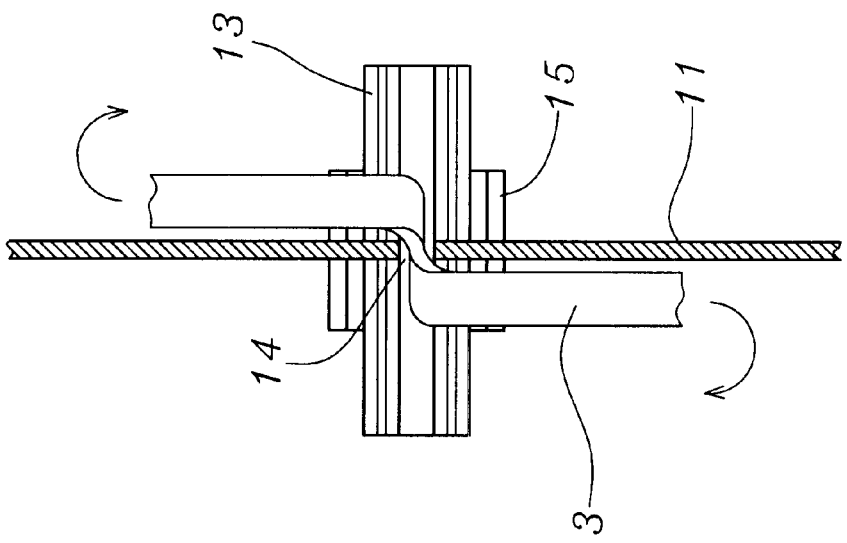
FIG. 8
FIG. 9

POSITIONING DEVICE OF A WIRE GROOVE IN A WIRE WINDING BOX

FIELD OF THE INVENTION

The present invention relates to a positioning device of a wire groove in a wire winding box, and especially to a wire winding box for automatically winding a communication wire and receiving the communication wire therein.

BACKGROUND OF THE INVENTION

The current communication devices, such as computers, modems, telephones, or fax machines need communication wires to connect these devices for communication. However, in order to avoid the communication wire is too long to be wound together or too short to be insufficient in using, there are various wire winding boxes being designed. In general, the wire winding box includes a box body, a housing, a communication wire, two wire winding disks; and two spiral springs. Therefore, the plug of the communication wire can be inserted into the communication devices for downloading data.

Referring to FIG. 1, a prior art wire winding box includes a box body 1a, a housing 2a, a communication wire 3a, two wire winding disks 4a and two spiral springs 5a. The box body 1a has two faces each being installed with a wire groove 11a for receiving the communication wire 3a. Each lateral side of the wire grooves 11a is installed with a wire hole 12a at a proper place for being protruded by the plug 31a and earphone 32a at two ends of the communication wire 3a. The inner lateral side of the wire groove 11a is formed with a shaft 13a. Each shaft 13a is axially installed with a groove hole 14a.

The housing 2a is formed by a first casing 21a and a second casing 22a, which can be buckled to the two surfaces of the box body 1a for sealing the two wire grooves 11a so as to position the communication wire 3a, wire winding disk 4a, and spiral spring 5a in the box body 1a.

Two wire winding disks 4a has a central axial hole 42a. Two surfaces of the disk 41a are formed with a spring fixing post 43a and a wire winding ring 44a. The spring fixing post 43a and the wire winding ring 44a surround the periphery of the central axial hole 42a and are concentric with the central axial hole 42a. The spring fixing post 43a is installed with a buckling hole 45a. The two wire winding disks 4a are received in the two wire grooves 11a in the box body 1a and are pivotally installed in the two shafts 13a through the axial holes 42a so that the wire winding disks 4a can rotate in the wire groove 11.

The communication wire 3a has two ends each being installed with a plug 31a and an earphone 32a. The two ends of the communication wire 3a may be wound as two parts for matching in the two wire grooves 11a of the box body 1a. The middle part of the communication wire 3a passes through the groove holes 14a on the shafts 13a in the two wire grooves 11a. Therefore, the two ends of the communication wire 3a are disposed in the two wire grooves 11a. The communication wire 3a can be wound around the exterior 47a and interior 48a of the wire winding ring 44a of the wire winding disk 4a. The plug 31a and earphone 32a at two ends of the communication wire 3a are protruded out from the wire holes 12a of the box body 1a.

Two spiral springs 5a are properly installed in the two wire grooves 11a of the box body 1. The buckling end 51a of each spiral spring 5a is buckled to the buckling hole 45a of the wire winding disk 4a so that the two spiral springs 5a are connected to the two wire winding disks 4a. As the wire winding disk 4a rotates, the spiral spring 5a will store dynamic energy.

Thereby, a wire winding box 4 can be assembled, in practical, the wire groove serves to receive a section of the communication wire 3a having a relative long length and the section can be rewound as desired. The user may insert the plug 31a of the communication wire 3a to a receptacle of a relative communication device for downloading relative data. The two ends of the communication wire 3a can be pulled out directly from the wire winding box. The two ends of the communication wire 3a are pulled by the spiral spring 5a in the box so that a certain pulling force is retained thereon, and thus the communication wire 3a can be wound back to the box. Therefore, the wire will not expose out and wind together.

In order to avoid that as the user pull the communication wire 3a, it will not be interfered by the tension of the winding force, the periphery of the wire winding disk 4a is installed with a plurality of buckling grooves 46a and a control device 6a. The control device 6a includes a swinging piece 61a swinging freely and a ratchet 62a rotating freely. By the special reaction connected the swinging piece 61a, ratchet 62a, and the buckling groove 46a of the wire winding disk 4a, the communication wire 3a can be fixed or rewound by pulling and releasing.

However, in the prior art wire winding box, after the communication wire 3 passes through the groove holes, it is directly wound around the shaft 13a and the wire winding disk 4a (see FIG. 2). Since the middle portion of the communication wire 3a does not been positioned, when one end of the communication wire 3a is pulled out from the wire winding box, it is very possible to affect another end. That is, another end will reduce into the box so that two ends of the communication wire 3a can not be retained in a proper length to be pulled out. Therefore, it is very possible that one end is pulled out with an overlong length, while another end is pulled out with an insufficient length.

SUMMARY OF THE INVENTION

Accordingly, the primary object of the present invention is to provide a positioning device of a wire groove in a wire winding box, in which when one end of the communication wire is pulled from the wire winding box, another end will not be affected. That is, another end will not reduce into the box body. Therefore, two ends of the communication wire may retain a predetermined length to expose out. The condition that one end is pulled out with a overlong length, while the other end is pulled out with an insufficient length does not occur.

The various objects and advantages of the present invention will be more readily understood from the following detailed description when reading in conjunction with the appended drawing.

BRIEF DESCRIPTION OF THE DRAWINGS

FIG. 8 is cross sectional view of the first embodiment in the present invention.

FIG. 9 is a cross sectional view of the second embodiment in the present invention.

DETAILED DESCRIPTION OF THE PREFERRED EMBODIMENTS

Figure 1:
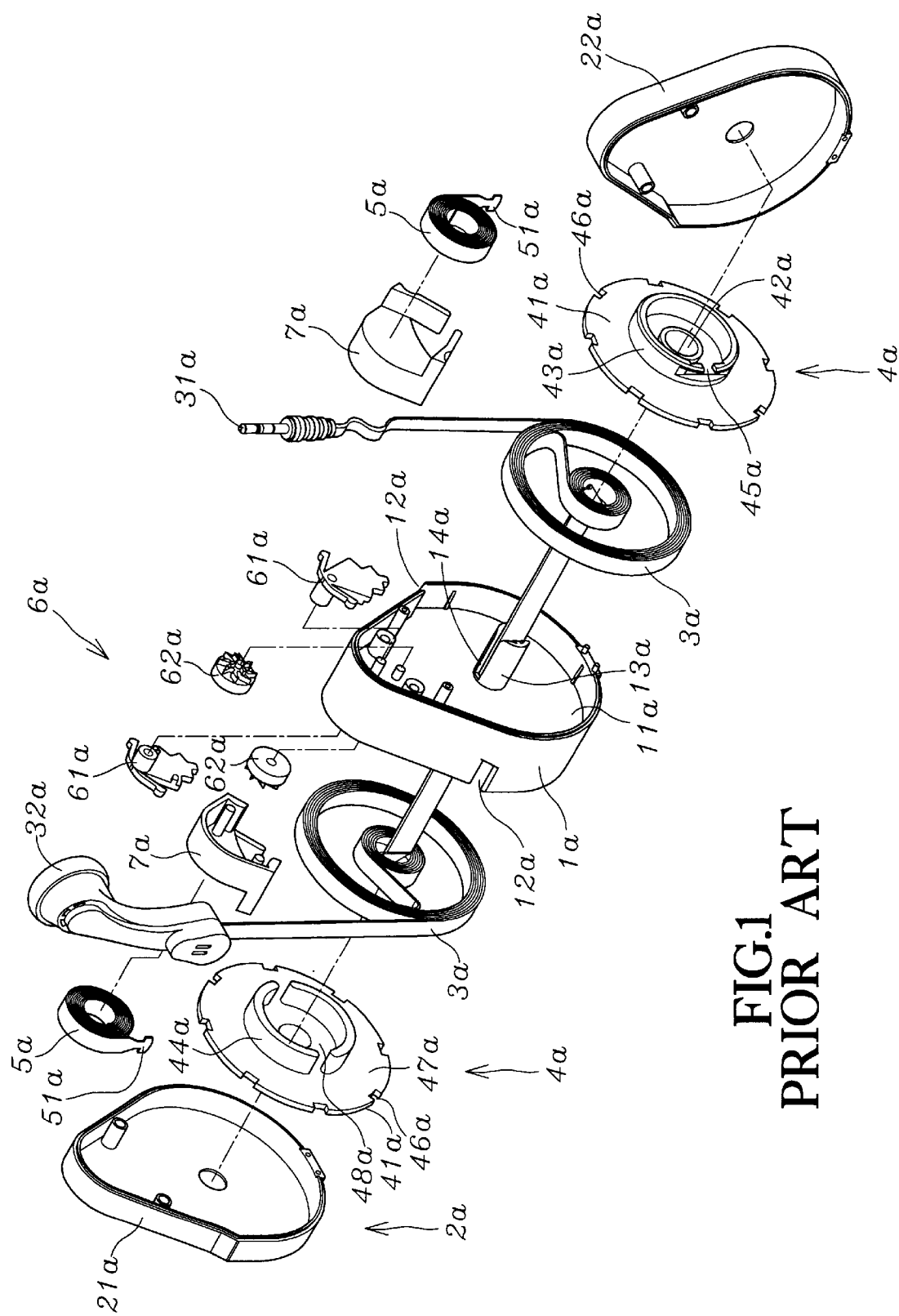
FIG. 1 is an exploded perspective view of a prior art.
Figure 2:
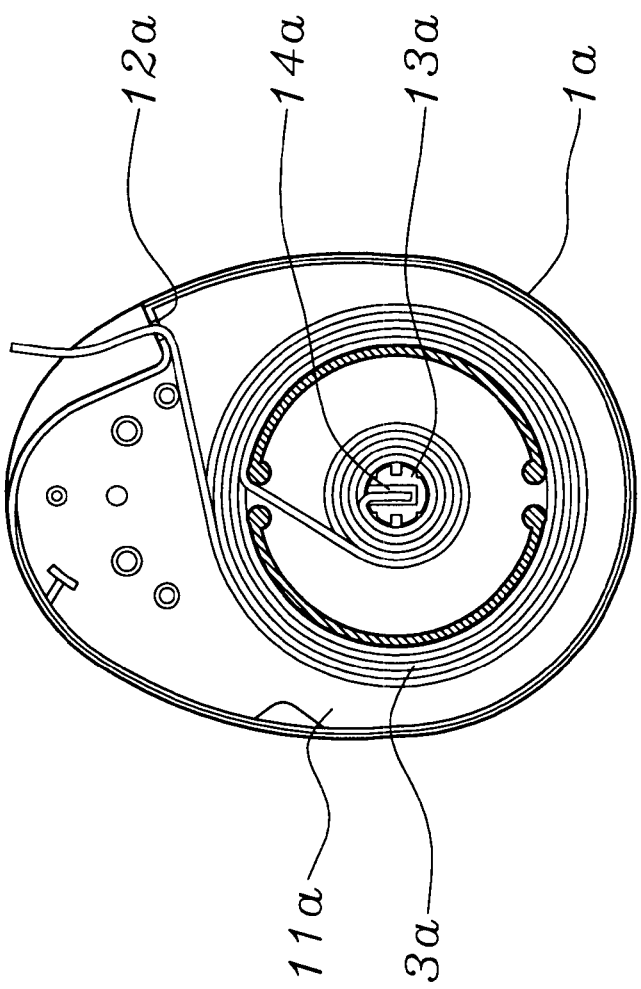
FIG. 2 is a plane view showing a prior art wire winding box.
Figure 3:
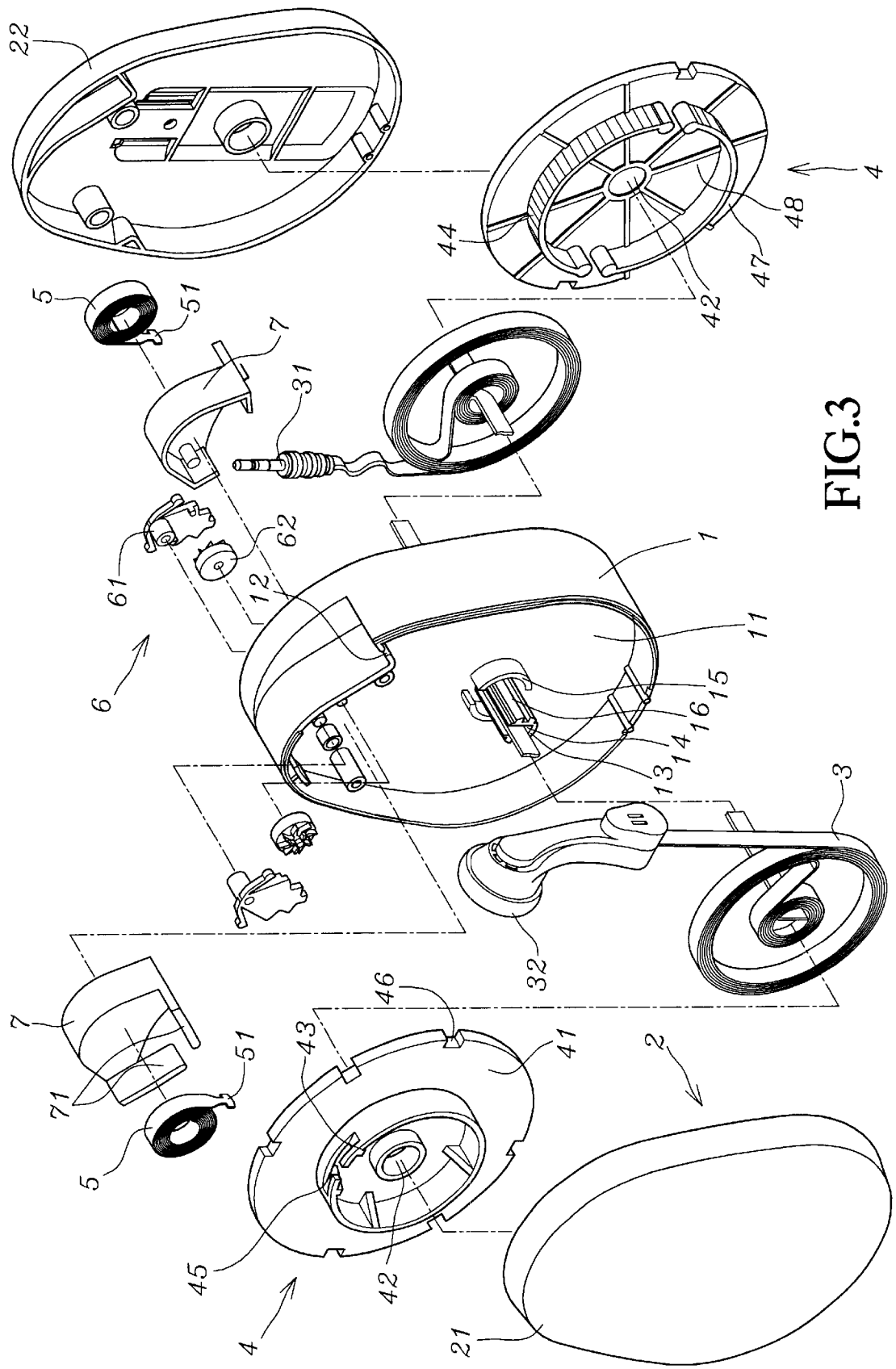
FIG. 3 is an exploded perspective view showing the structure of the first embodiment in the present invention.

With reference to FIGS. 3 to 6, the embodiment of a positioning device of a wire groove in a wire winding box according to the present invention is illustrated. The wire winding box includes a box body 1, a housing 2, a communication wire 3, two wire winding disks 4 and two spiral springs 5.

The box body 1 has two faces each being installed with a wire groove 11 for receiving the communication wire 3. Each lateral side of the wire grooves 11 is installed with a wire hole 12 at a proper place for being protruded by two ends of the communication wire 3. The inner lateral side of the wire groove 11 is formed with a shaft 13. Each shaft 13 is axially installed with a groove hole 14. The groove holes 14 in the two wire grooves 11 are communicated with one another. The inner lateral surface of the wire groove 11 is further installed with at least one positioning piece 15. In this embodiment, two positioning pieces 15 are installed. Each positioning piece 15 has a round shape and surround the shaft 13 with a proper distance therebetween so that a positioning groove 16 is formed between each positioning piece 15 and the shaft 13.

The housing 2 is formed by a first casing 21 and a second casing 22, which can be buckled to the two surfaces of the box body 1 for sealing the two wire grooves 11 so as to position the communication wire 3, wire winding disk 4, and spiral spring 5 in the box body 1.

Each of two wire winding disks 4 has a central axial hole 42. Two surfaces of the disk 41 are formed with a spring fixing post 43 and a wire winding ring 44. The spring fixing post 43 and the wire winding ring 44 surround the periphery of the central axial hole 42 and is concentric with the central axial hole 42. The spring fixing post 43 is installed with a buckling hole 45. The two wire winding disks 4 are received in the two wire grooves 11 in the box body 1 and are pivotally installed in the two shafts 13 through the axial holes 42 so that the wire winding disks 4 can rotate in the wire groove 11.

The communication wire 3 has two ends each being installed with a plug 31 and an earphone 32. Both of the two ends of the communication wire 3 may be installed with plugs 31 or other devices as desired.. The two ends of the communication wire 3 may be wound as two parts for matching in the two wire grooves 11 of the box body 1. The middle part of the communication wire 3 passes through the groove holes 11 on the shafts 13 in the two wire grooves 11. Therefore, parts of the two ends of the communication wire are disposed in the two wire grooves 11. The communication wire 3 can wind around the shaft 13 and the exterior 47 and interior 48 of the wire winding ring 44 of the wire winding disk 4. Two ends of the communication wire 3 are protruded out from the wire holes 12 of the box body 1.

Two spiral springs 5 are properly installed in the two wire grooves 11 of the box body 1. The buckling end 51 of each spiral spring 5 is buckled to the buckling hole 45 of the wire winding disk 4 so that the two spiral springs 5 are connected to the two wire winding disks 4. As the wire winding disk 4 rotates, the spiral spring 5 will store dynamic energy.

Figure 4:
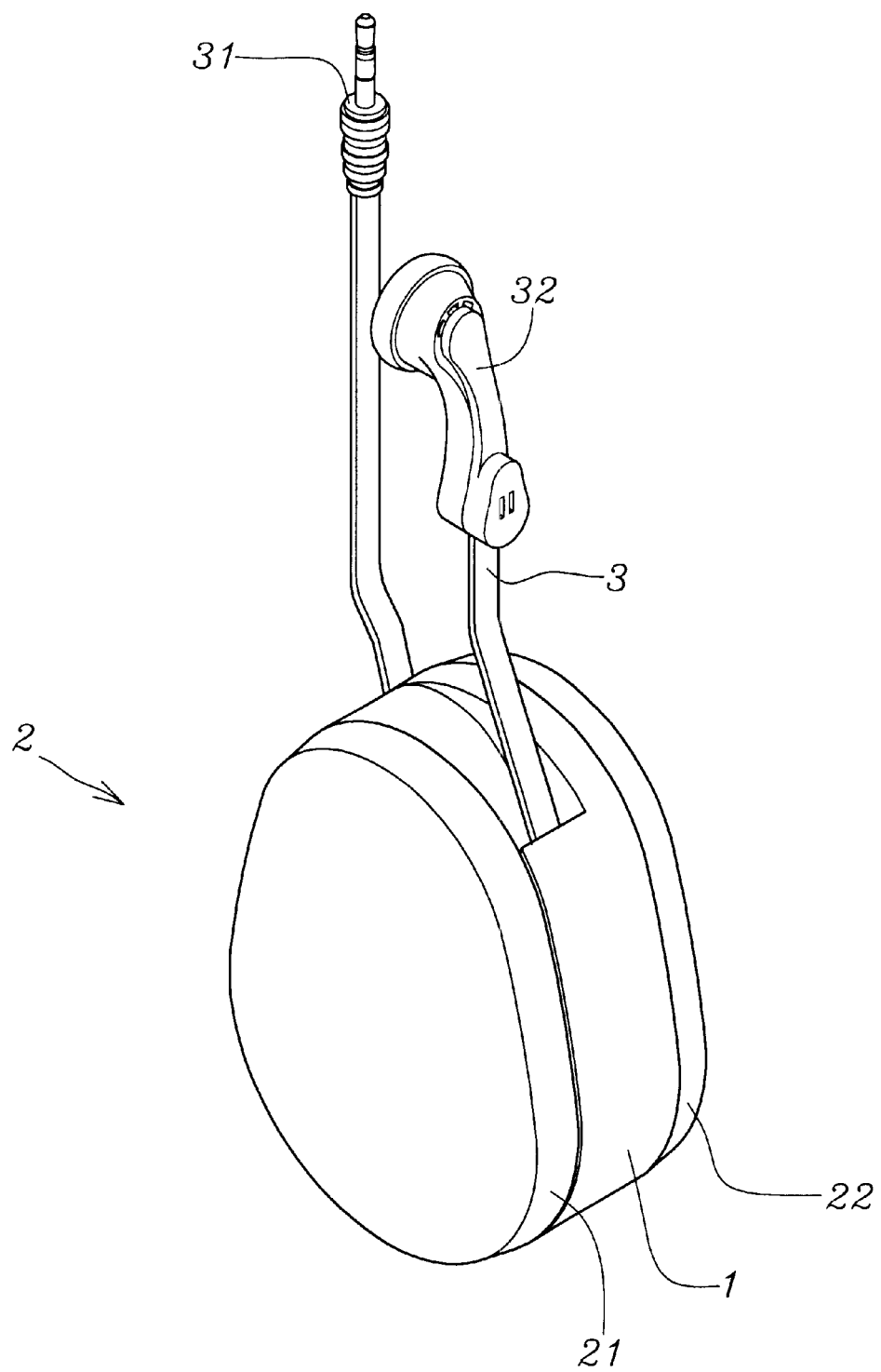
FIG. 4 is an assembled perspective view showing the structure of the first embodiment in the present invention.
Figure 5:
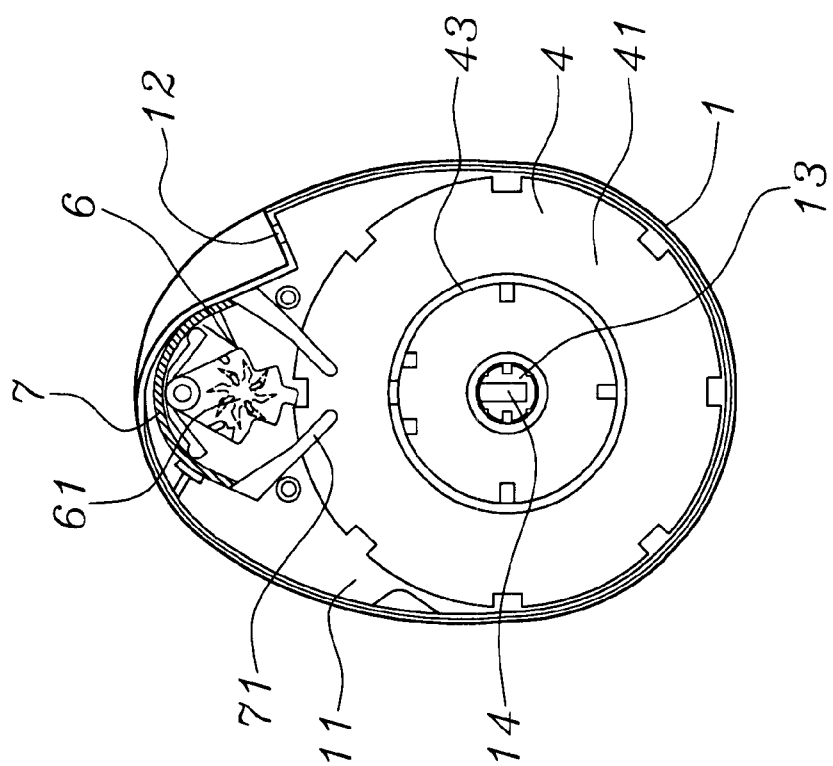
FIG. 5 is a plane view showing the structure of the first embodiment.

Thereby, the wire winding box as shown in FIG. 4 can be assembled, In practical, the wire groove serves to receive a section of the communication wire 3 having a relative long length and the section can be received as desired. The user may insert the plug 31 of the communication wire 3 to a receptacle of a relative communication device for downloading relative data. The two ends of the communication wire 3 can be pulled out directly from the wire winding box. The two ends of the communication wire 3 are pulled by the spiral spring 5 in the box so that a certain pulling force is retained thereon, and thus the communication wire can be wound back to the box. Therefore, the wire will not expose out and wind together.

A support seat 7 is installed in the wire groove 11 of the box body 1. Two sides of the support seat 7 are protruded with two stoppers 71 so that the spiral spring 5 can be received between the support seat 7 and the wall of the housing 2. Besides, in order to avoid that as the user pull the communication wire 3, it will not be interfered by the tension of the winding force, the periphery of the wire winding disk 4 is installed with a plurality of buckling grooves 46 and a control device 6. The control device 6 includes a swinging piece 61 swinging freely and a ratchet 62 rotating freely. By the special reaction connected the swinging piece 61, ratchet 62, and the buckling groove 46 of the wire winding disk 4, the communication wire 3 can be fixed or rewound by pulling and releasing.

Figure 6:
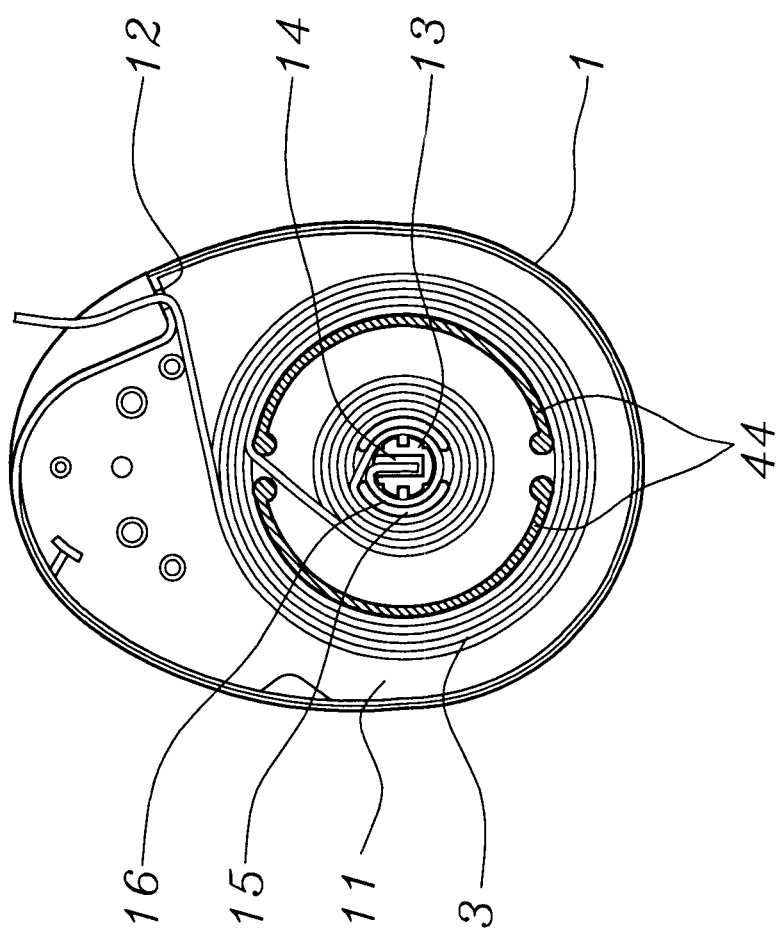
FIG. 6 is a plane view showing the wire winding of the first embodiment in the present invention.

In the present invention, the inner lateral surface of the wire groove 11 of the box body 1 is formed with at least one positioning piece 15, as the communication wire 3 passes through the groove from the groove hole 14, it at first passes through the positioning groove 16 between the positioning piece 15 and the shaft 13 (see FIGS. 6 and 8). By clamping and positioning of the positioning groove 16, the middle portion of the communication wire 3 can be clamped and fixed in the positioning groove 16 of the two wire grooves 11 without being pulled. Therefore, as one end of the communication wire 3 is pulled out from the wire winding box, another end is not be affected. Namely, another end will not wind back to the box. Therefore, two ends of the communication wire 3 may be retained with a proper length. The condition that one end is pulled out with a large length, while the other end is pulled out will a short length does not occur.

Figure 7:
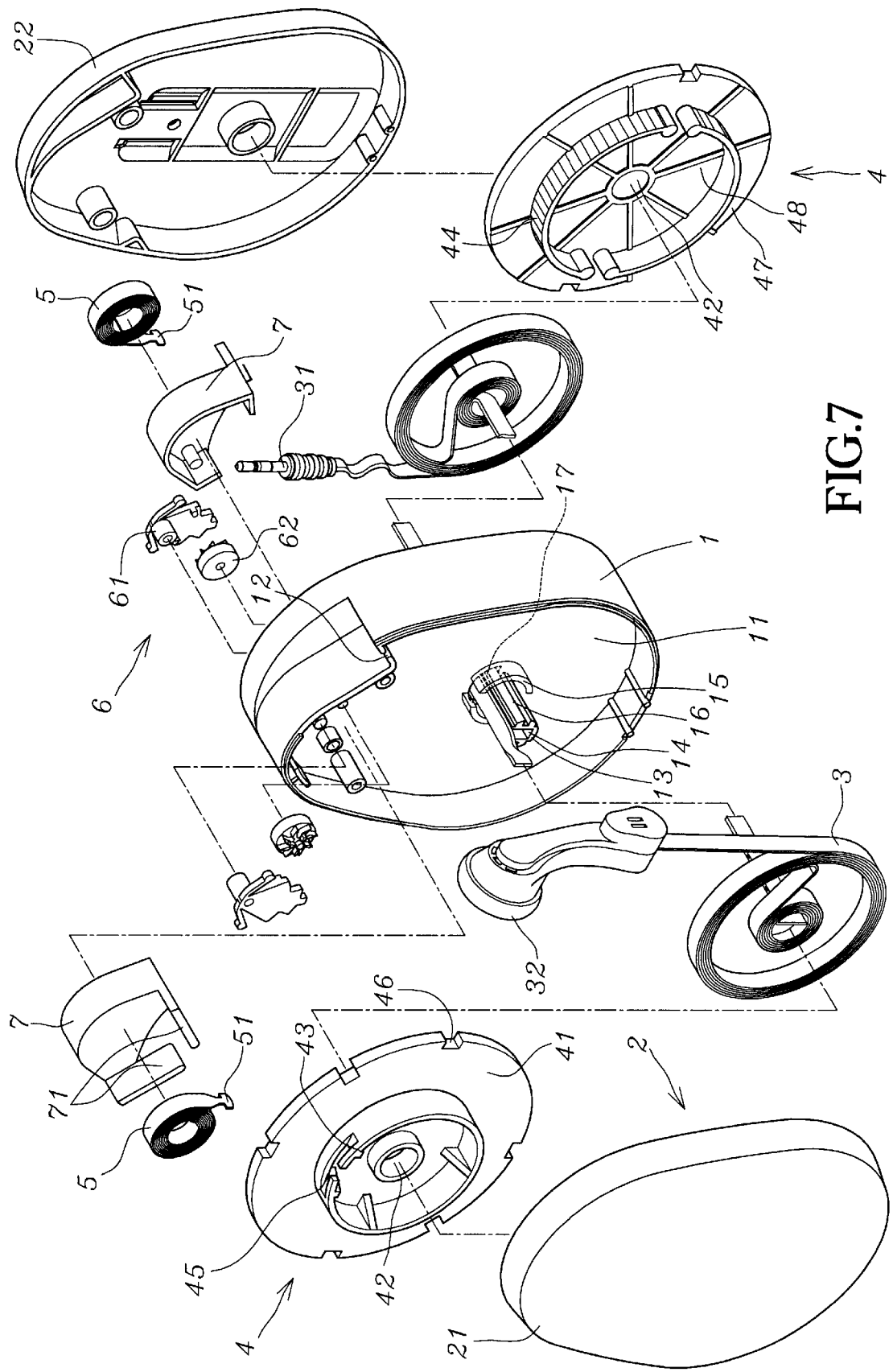
FIG. 7 is an exploded perspective view of the second embodiment in the present invention.

Referring to FIG. 7, another embodiment of the positioning device of the wire groove of a wire winding box in the present invention is illustrated. The difference of this embodiment to the aforesaid embodiment is that a penetrating groove hole 17 is installed between the two wire grooves 11 of the box body 1, the groove hole 17 is installed at the periphery of base of the shaft 13. Two ends of the groove hole 17 are communicated with the two wire grooves 11 so that the middle portion of the communication wire 3 may pass through the groove hole 17 between two wire grooves 11. Therefore, two ends of the communication wire 3 may be installed in the two wire grooves 11. Therefore, as the communication wire 3 passes through from the groove hole 17, it can be at first pass through the positioning groove 16 between the positioning piece 15 and the shaft 13 (see FIG. 9). By clamping and positioning of the positioning groove 16, the communication wire 3 near the center thereof is clamped and positioned in the positioning grooves 16 within the two wire grooves 11.

Another, in this embodiment, a double wire winding disk 4 is disclosed. Of course, a single wire winding disk 4 can be designed. Namely, one surface of the box body 1 is installed with a wire groove 11 which is further matched with a wire winding disk 4 and a spiral spring 5. The communication wire 3 is wound around the wire groove 11 in the box body 1. One end of the communication wire 3 protrudes out from the wire groove 11 of the box body 1. Another end protrudes out from the groove hole 14 or 17 which is communicated with outer environment. When the communication wire 3 enters into the positioning groove 16 from the groove hole 14 or 17, it is clamped and positioned by the positioning groove 16.

In summary, the present invention has improved the defect in the prior art wire winding box. In the prior art, the middle portion of the communication wire does not be positioned; when one end of the communication wire is pulled from the wire winding box, it is very possible affect another end so that two ends of the communication wire can not retain with a proper protruding length. However, these problems are improved by the present invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A positioning device of a wire groove in a wire winding box comprising:

a box body having a wire groove in at least one surface; each side of the wire groove having a wire hole; and an inner lateral side of the wire groove having a shaft and a groove hole;

a housing for sealing the wire groove;

at least one wire winding disk having a central axial hole at a center of the disk; a surface of the disk having a wire winding ring; the wire winding ring being surround a periphery of the central axial hole; the wire winding disk being received in the wire groove of the box body and being pivotally installed in the wire groove of the box body through the axial hole;

a communication wire winding in the wire groove of the box body; the communication wire passing through the groove hole and winding around an exterior and an interior of the wire winding ring and wire winding disk; and one end of the communication wire protruding from the wire hole of the box body, while another end protruding from the groove hole of the box body; and at least one spiral spring positioned in the box body and being connected with the wire winding disk;

characterized in that an inner lateral surface of the wire groove being installed with at least one positioning piece; a positioning groove being formed between the positioning piece and the shaft; when the communication wire is inserted from the groove hole, the wire passes through the positioning groove and is clamped and positioned in the positioning groove.

2. The positioning device of a wire groove in a wire winding box as claimed in claim 1, wherein the positioning piece is a round plate.

3. The positioning device of a wire groove in a wire winding box as claimed in claim 1, wherein a spring positioning post is installed in another lateral surface of the wire winding disk; the spring positioning post is installed with a buckling hole and is buckled in the buckling hole of the wire winding disk by a buckling end thereof.

4. The positioning device of a wire groove in a wire winding box as claimed in claim 1, wherein a support seat is installed in the wire groove of the box body; two sides of the support seat protrudes with two stoppers so that the spiral spring is received between the support seat and a wall of the housing.

5. The positioning device of a wire groove in a wire winding box as claimed in claim 1, wherein a plurality of buckling grooves are installed on an periphery of the wire winding disk; a control device is installed to be adjacent to the wire winding disk; the control device includes a swinging piece swinging freely and a ratchet rotating freely; by the interaction of the swinging piece, ratchet, and buckling groove of the wire winding disk, the communication wire can be pulled and released repeatedly for fixing and rewinding.

* * * * *